United States Patent
Prichard

[15] 3,681,449
[45] Aug. 1, 1972

[54] CATALYTIC PREPARATION OF CHLOROACID CHLORIDES

[72] Inventor: William W. Prichard, Hockessin, Del.

[73] Assignee: E. I. du Pont de Nemours and Company, Wilmington, Del.

[22] Filed: July 23, 1970

[21] Appl. No.: 57,751

[52] U.S. Cl. .................... 260/544 A, 260/544 K
[51] Int. Cl. ............................................ C07c 51/58
[58] Field of Search ........... 260/544 A, 544 K, 544 Y

[56] References Cited

UNITED STATES PATENTS 3,468,947  9/1969  Scheber ...................... 260/544
3,119,861  1/1964  Blackham .................... 260/544

FOREIGN PATENTS OR APPLICATIONS 177,362  5/1922  Great Britain
987,516  3/1965  Great Britain Primary Examiner—Lorraine A. Weinberger
Assistant Examiner—Richard D. Kelly
Attorney—James A. Costello

[57] ABSTRACT

Disclosed herein is a process for making chloroacid chlorides by reacting olefinic compounds with either phosgene in the presence of carbon monoxide, or with the equivalent of phosgene, a preheated mixture of chlorine and carbon monoxide. Where the phosgene equivalent is employed, carbon monoxide is used in excess over the amount required to give phosgene. The process is carried out in the presence of palladium and/or rhodium catalysts, at temperatures of above about 75° C. and pressures of above about 100 atmospheres.

8 Claims, No Drawings

CATALYTIC PREPARATION OF CHLOROACID CHLORIDES

BACKGROUND OF THE INVENTION

1. Field of the Invention

This invention relates to a novel catalytic process for making chloroacid chlorides.

2. Description of the Prior Art

None of the following references, which are typical of the prior art, even suggests the novel process of this invention. Chloroacid chlorides have been made using free radical-forming catalysts. For instance, Foster et al., J. Am. Chem. Soc., 78, 5606 (1956), teach the use of acetyl peroxide, along with ethylene, carbon monoxide and chlorine to produce β-chloropropionyl chloride.

Palladium compounds have been used as reactants. For instance, Blackham, U.S. Pat. No. 3,119,861 reacts carbon monoxide and olefin-palladium dichloride complexes to make chloroacid chlorides.

Finally, palladium has been used as a catalyst. However, reaction mechanisms have been completely different from that disclosed herein. For instance, German Pat. No. 1,237,116, teaches using palladium as a catalyst with carbon monoxide; however, acetylene and hydrogen chloride are necessary to produce β-chloropropionyl chloride. Ethylene, hydrogen chloride and carbon monoxide in the presence of the catalyst, produces only propionyl chloride.

SUMMARY OF THE INVENTION

The process of this invention comprises making chloroacid chlorides by reacting (a) an aliphatic or cycloaliphatic ethylenically unsaturated hydrocarbon of two to 10 carbons, with (b) phosgene, in the presence of carbon monoxide and a catalytic amount of a palladium and/or rhodium catalyst, at pressures of above about 100 atmospheres and temperatures of above about 75° C.

In place of phosgene, a preheated mixture of chlorine and carbon monoxide can be used. It is well known that heating a mixture of $Cl_2$ and CO, especially in the presence of carbon, gives phosgene according to the following equation:

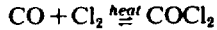

$$CO + Cl_2 \xrightarrow{heat} COCl_2$$

Accordingly, language employed herein to describe and/or claim the reaction of an unsaturated hydrocarbon with phosgene under the disclosed reaction conditions must be understood to include the reaction of said hydrocarbon with the phosgene equivalent, a preheated mixture of carbon monoxide and chlorine. In this regard, when the hydrocarbon is reacted with a mixture of carbon monoxide and chlorine, carbon monoxide is employed in excess of the amount necessary to combine with the chlorine to give phosgene.

DESCRIPTION OF THE PREFERRED EMBODIMENTS

The olefinic compounds employed in the practice of this invention are hydrocarbons having from two to 10 carbons atoms and up to two ethylenic double bonds. When more than one nonaromatic double bond is present, it can be either conjugated or non-conjugated. Aliphatic and cycloaliphatic olefinic unsaturated compounds are included and of these ethylene and propylene are preferred. Ethylene is especially preferred. Other useful olefins include butene-1, butene-2, isobutene, hexene-1, decene-1, cyclohexadiene, cyclopentadiene, ethyl cyclohexene, styrene, 1,5-hexadiene, isooctene, and octene-1.

To add the elements of phosgene (i.e., —Cl and —COCl) to an olefin in the presence of a catalytic amount of a palladium and/or rhodium compound, an excess of CO must be present. The reaction ceases without this excess, probably because the palladium or rhodium is not maintained in a catalytically active form. For best results the excess CO should be present in an amount of at least about 50 atmospheres.

By palladium and/or rhodium catalyst compounds are meant palladium and/or rhodium metals or compositions and complexes thereof. The metals can be employed on supports such as carbon or as ligand bound complexes such as bis-triaryl phosphine palladium or rhodium dihalides. The only requirement is that the palladium or rhodium catalyst be present as a metal or as a salt which will react with chlorine or phosgene under the conditions employed to produce palladium or rhodium chlorides.

The amount of palladium or rhodium employed varies with the reaction conditions. In a continuous flow process, the total weight of catalyst may be as low as or lower than 0.0001%, of the weight of the olefin processed. In a batch process, the catalyst can be 0.1 to about 1%, by weight of the olefin. Lower catalyst concentrations are not preferred because slow reaction rates may result. Significantly higher catalyst concentrations than those given above will increase reaction rates but may be economically impractical.

Added solvents or carriers are not necessary in the practice of this invention. Additional solvents may be employed, however, in which case they should not react with the reactants or products. Useful solvents are those which are free from aliphatic unsaturation and include aromatic hydrocarbons such as benzene, toluene, xylene; aliphatic hydrocarbons such as octane; halogenated hydrocarbons such as carbon tetrachloride; oxygenated compounds such as dioxane, aliphatic ethers, esters such as methylpropionate, and acid chlorides including the chloroacid chlorides that are produced by the reaction.

The reaction temperatures should be at least 75° C. and no more than about 200° C. for best results. The preferred temperature range is 100°–160° C. Pressures should be maintained between 100 to 3,000 atmospheres for best results. Time, temperature and pressure are interdependent variables. Times of from an hour to 10 hours are useful, but shorter times can be employed, particularly if the operation is conducted on a continuous basis by cycling the reactants over the palladium or rhodium catalyst.

The following examples illustrate some of the subject matter included within the broad scope of this invention.

SPECIFIC EMBODIMENTS

EXAMPLE 1

A pressure vessel lined with a corrosion resistant alloy was charged with 25 parts of dioxane, 0.5 parts of bis-triphenylsphosphine-palladium dichloride and 25 parts of phosgene. The vessel was sealed, pressured to 300 atmospheres with a 1/1 mixture of ethylene and carbon monoxide and heated at 160° C., with agitation, for 8 hours. A top pressure of 650 atmospheres was developed, which fell to 550 atmospheres during the first 2 hours of heating. The vessel was cooled, vented and the contents removed and distilled. The product contained 9.4 parts of propionyl chloride and 12.4 parts of β-chloropropionyl chloride which was identified by hydrolysis to the acid, m.p. 38.5° (reported 39°), determination of a neutral equivalent of 63.6 (calc. 63.4) and a proton NMR spectrum which consisted of two equal peaks in a $A_2B_2$ pattern centered at 6.22τ and 6.6 τ.

EXAMPLE 2

The procedure of Example 1 was repeated, replacing the dioxane by 25 parts of benzene. The product contained 23.9 parts of β-chloropropionyl chloride and 3.1 parts of propionyl chloride. No higher boiling residue was present.

EXAMPLE 3

The pressure vessel of Example 1 was charged with 10 parts of β-chloropropionyl chloride, 1 part of a 10% Pd on C catalyst, 35 parts of phosgene and 300 atmospheres of CO. The vessel was heated to 130° C. at which temperature the total pressure was 350 atmospheres, and the pressure increased to 800 atmospheres with ethylene and held for 8 hours at temperature. A pressure drop of 215 atmospheres was noted.

The contents of the vessel, 50 parts, were discharged and filtered to remove 2.3 parts of black solid. The filtrate, on distillation was separated into 7.4 parts phosgene, 2.0 parts propionyl chloride and 38.2 parts of β-chloropropionyl chloride with no non-volatile residue.

The 2.3 parts of recovered catalyst was recharged into the reaction vessel and rerun under the same conditions. The product, 47.4 parts, contained 34.1 parts of β-chloropropionyl chloride, 2.15 parts of propionyl chloride, 9.8 parts of phosgene and 1.4 parts of solid. The solid was recharged and rerun under the same conditions to give β-chloropropionyl chloride in slightly lower amounts.

EXAMPLE 4

The pressure vessel of Example 1 was charged with 10 parts of β-chloropropionyl chloride, 1 part of a 10% rhodium on carbon catalyst and 30 parts of phosgene. The vessel was sealed, pressured to 100 atmospheres with a 1/1 mixture of CO and ethylene and heated at 130° for 8 hours at 400 atmospheres pressure. The product contained 37 parts β-chloropropionyl chloride, 2.6 parts of propionyl chloride, with 3.45 parts of phosgene recovered.

EXAMPLE 5

The pressure vessel of Example 1 was charged with 10 parts of benzene, 1 part of 10% Pd on C, 20 parts of propylene and 30 parts of phosgene. The sealed vessel was pressured to 200 atmospheres with CO and heated at 600 atmospheres for 6 hours at 130°. The product contained 13.8 parts of 3-chloro-n-butyryl chloride (bp 52°–54/20 mm), and 8.1 parts of phosgene along with the benzene (10 parts).

EXAMPLE 6

The procedure of Example 5 was repeated, replacing the propylene by 50 parts of cyclohexene. Distillation of the product showed it to contain 5.5 parts of 2-chlorocyclohexylcarbonyl chloride and 46 parts of recovered cyclohexene.

EXAMPLE 7

The pressure vessel of Example 1 was charged with 15 parts of β-chloropropionyl chloride, 0.5 parts of bis-triphenyl phosphine palladium dichloride and 35 parts of chlorine. The vessel was pressured to 200 atmospheres with CO and heated at 160° for 1 hour. The pressure was now 225 atmospheres. This was increased to 440 atmospheres with ethylene and held at 160° for 6 hours. The product contained 27 parts of β-chloropropionyl chloride, 19.3 parts of phosgene, 1 part of propionyl chloride and only 0.63 part of residue.

EXAMPLE 8

The vessel of Example 1 was charged with 20 parts of benzene, 30 parts of butadiene, 30 parts of phosgene and 1 part of 10% Pd on C. The vessel was pressured to 200 atmospheres of CO and heated at 130° at a top pressure of 280 atmospheres for 4 hours. The total product of 49.8 parts, contained 6.7 parts of the acid chloride of 5-chloropentene-2-oic acid, bp 81°–83°/10 mm., identified by examination of its NMR spectrum and formation of its amide.

The embodiments of the invention in which an exclusive property or privilege is claimed are defined as follows:

1. A process for making chloroacid chlorides comprising reacting
   a. an aliphatic or cycloaliphatic ethylenically unsaturated hydrocarbon of two to 10 carbon atoms, with
   b. phosgene,
in the presence of carbon monoxide and a catalytic amount of a palladium or rhodium catalyst, at a temperature from 75° to 200° C and a pressure of between 100 to 3,000 atmospheres.

2. The process of claim 1, wherein the unsaturated hydrocarbon is ethylene.

3. The process of claim 1, wherein the unsaturated hydrocarbon is propylene.

4. The process of claim 1, wherein a catalytic amount of a palladium catalyst is employed.

5. The process of claim 1, wherein a catalytic amount of a rhodium catalyst is employed.

6. A process according to claim 1, conducted in the presence of a catalytic amount of a catalyst selected from bis-triphenylphosphine-palladium dichloride, palladium supported on carbon, and rhodium supported on carbon, at a temperature of from 100° to 160° C. and a pressure of from 100 to 3,000 atmospheres.

7. The process of claim 6, wherein the unsaturated hydrocarbon is ethylene.

8. The process of claim 6, wherein the unsaturated hydrocarbon is propylene.

* * * * *